United States Patent [19]

Adler et al.

[11] 4,010,372

[45] Mar. 1, 1977

[54] DEVICE FOR MEASURING THE ULTRA-VIOLET RADIATION IN THE UV-A AND/OR UV-B RANGE

[75] Inventors: Karl Adler, Grenchen; Ernst Strutz, Zurich, both of Switzerland

[73] Assignee: Biviator AG, Grenchen, Switzerland

[22] Filed: July 10, 1975

[21] Appl. No.: 594,647

[30] Foreign Application Priority Data

July 16, 1974 Switzerland .................. 9757/74

[52] U.S. Cl. .......................... 250/372; 250/252
[51] Int. Cl.² .............................. G01J 1/42
[58] Field of Search ..................... 250/252, 372

[56] References Cited
UNITED STATES PATENTS

| | | | |
|---|---|---|---|
| 3,710,115 | 1/1973 | Jubb | 250/372 |
| 3,917,948 | 11/1975 | Strutz | 250/372 |

*Primary Examiner*—Archie R. Borchelt
*Attorney, Agent, or Firm*—Imirie, Smiley & Linn

[57] ABSTRACT

This invention relates to a device for measuring the ultraviolet radiation in the UV-A and/or UV-B range with detector means for said ranges, switching means for considering the skin sensitivity, electronic means for evaluating the signals derived from the detector, means for displaying the intensity and/or the dose of the radiation and second switching means for selecting one of different quartz lamps in said ranges. This device is in particular adapted for digitally measuring the dose of harmful erythem effective UV-B radiation or the dose of therapeutic healing UV-A radiation. This invention further relates to a method for producing and calibrating said devices, in particular the shunts contained in said second switching means which enables to select different quartz lamps with different line intensities.

4 Claims, 5 Drawing Figures

DEVICE FOR MEASURING THE ULTRA-VIOLET RADIATION IN THE UV-A AND/OR UV-B RANGE

BACKGROUND OF THE INVENTION

The present invention relates to a device for measuring the ultra-violet (hereinafter called UV) radiation in the UV-A range and in the UV-B range and to a method for manufacturing this device.

UV radiation meters are intended either to prevent persons from a too long and thus harmful influence of erythem-effective radiation, on the one hand, during a sun bath or a mountain tour, i.e., during a natural irradiation, and on the other hand, during an artificial irradiation from so-called solaria or home UV radiators, or to indicate the suited irradiation duration for therapy purposes. In the recent time there have become known, especially by the applicant, devices for measuring either the erythem-effective radiation intensity (U.S. Pat. No. 3,851,970) or the already received dose (U.S. application Ser. No. 440,579). The manufacture of such measuring devices is based on the natural sun light or on a well determined artificial UV source. With the aid of a filter combination a predetermined wavelength range is cut out from the sun light spectrum or from the spectrum of the artificial UV source and then the scale of the measuring device can be calibrated in microwatts per square centimeter. But it is to be noted that the wave length range results from the cooperation of the filter combination with the measuring cell so that after a change of the measuring cell perhaps another filter combination has to be chosen. There are many different radiators on the market having different line intensities. These different line intensities cause within the effective wave length range defined by the filters and the measuring cell different irradiation durations or erythem thresholds, respectively. It is therefore necessary to calibrate the UV radiation measuring devices for the natural light and for the different artificial UV radiators.

SUMMARY OF THE INVENTION

It is therefore an object of the present invention to provide a device for measuring the ultra-violet radiation in the UV-A and / or UV-B range, comprising at least one optical filter for passing radiation in the range sensitivity of the user, electronic means for evaluating the signals from the detector, displaying means for the intensity and / or the dose of said radiation and second switching means for considering the different line intensities of at least two different quartz lamps in the UV-A and / or UV-B range.

The invention will be best understood from the following description of an embodiment taken in conjunction with the accompanying drawing.

Figure 1:
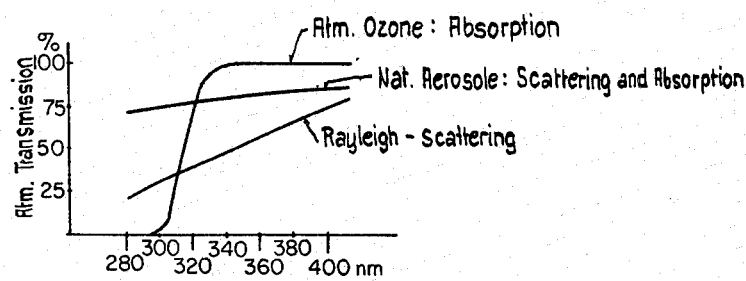
FIG. 1 shows the reduction of the remaining UV sun radiation by absorption and scattering.

UV measuring devices cannot be considered as a fashionable craze since the harmful influence of the UV radiation and its results both in the field of the dermatology and to the vegetative system and the danger of latent infections due to exceeding the erythem threshold time are known. With the aid of the devices manufactured in accordance with the above mentioned method diseases occurring immediately or later on or even skin-cancer should be avoided in the future, but especially the activation of latent infections of different organs. Furher it should enable the determination of the irradiation time for a therapeutic use in the UV-A range.

In the following the calibration method is described with respect to the UV-B range, but the calibration in the UV-A range can be done in an analog manner. It might be assumed that, if it is possible to measure the UV-B intensities, i.e., the erythem-effective UV-B radiation, it is easy to determine the irradiation durations, but that is not true. The spectral sensitivity of a cell, even if it is in an extremely suited range, does not ensure the evaluation of different intensities which are very different for the natural UV radiation and for the different artifical UV sources due to the different line intensities of the different radiators. The present method and the device manufactured in accordance thereto give the possibility to measure the intensity of the different UV radiation sources and to determine the associated desired threshold time.

In order to obtain erythem threshold times by measurements it is necessary to know the erythem effectiveness for different wavelengths in the UV range, further the distribution of the different spectral lines of the natural UV and of the different UV radiation sources and the changes of the distribution of the natural UV with respect to the atmosphere and the altitude above sea level. The erythem effectiveness of the UV wave lengths from 238 nm to 313 nm and the erythem doses for natural UV (80 m$\omega$sec/cm$^2$) and for artificial UV (20 m$\omega$sec/cm$^2$) are proposed and known from Hausser, Vahle, Coblentz, Pfleiderer, Büttner, further from Adams, Barens, Forsythey, Seitz and from the International Illumination Committee (IBK) (Strahlentherapie 137, 238 to 250, physikalische, biologische und photochemische Wirkung der UV-Strahlen, Erythem und Pigment, 250 ff) see FIG. 2, graph $b$.

The distribution of the line intensities with natural UV is also known from Bener (Sci. Proc. Int. Ass. Meteorol. Rome 1954, 543, (1956)); (Int. congress of biometeorology, Rutgers University, N.Y. 1966) see FIG. 2 graph $a$.

The differences of the radiation therapy lamps and their spectral lines are known too and are indicated by the respective manufacturers. This was determined for four therapy lamps by R. Lotmar in "Zeitschrift fuer physikalische Medizin" Vol. 19, 45–48, 1966. The correctness of the erythem effectiveness with respect to the different spectral lines and the erythem doses are proved by Dr. R. Lotmar, clinic for rheumatics at the cantonal hospital of Zurich with the classic arrangement of irradiation steps by using the epigastrum as the irradiated skin location with the aid of the resist method ("Zeitschrift fuer physikalische Medizin" Vol. 19, 45–48, 1966), by W. Lotmar and R. Rüst, test of the resist method, measurements by Dr. R. Reiter, bioclimatic research station Garmisch-Patenkirchen and by Pat. Meissen, meteorological station Disentis, further by Prof. Dr. Pfleiderer, Westerland-Sylt, Prof. Dr. A. Böni, University of Zurich, Prof. Dr Jessel, Westerland-Sylt ("Strahlentherapie" 137–238-250, 138/2, 136/4 by R. Lotmar).

The diversity of the intensity of natural UV with respect to the daytime, to the UV global radiation and UV sky radiation and to the altitude above sea level is known too and was measured in different regions. In the same manner the different intensities are determined with respect to reflections onto backgrounds or soils, such as concrete soil, meadows, beach sand, water, new snow, a.s.o. In a summary it can be said that there are present constant values erythem effectiveness and erythem dose
variable values different spectral lines and line intensities of different radiators and thus their difference to natural UV, further the intensity of the natural UV in response to the altitude above sea level and to the reflections onto different materials.

Wheras the constant values are determined, i.e., can be used directly for a measuring method, it is to be noted that the tabulation of the variable values for the practical use is very difficult. Therefore it would be desirable to have a measuring method with the aid of which, on the one hand, the really existing erythem-effective UV-B radiation and the therapy-effective UV-A radiation can be measured independent of the altitude above sea level or the used artifical radiation source or the environment, a.s.o., and, on the other hand, it is possible to allocate conversion factors to the detector with the aid of a computing method whereby the different radiation sources can be evaluated and displayed directly.

The evaluation of the different measuring results is done by the hitherto known UV measuring devices by displaying the intensity or dose in microwatts or microwattseconds or by associating it to an erythem threshold time (EZ), with respect to sensitive and insensitive persons, in consideration of the adaptation days, by a single measurement or an integration of different doses, the evaluation and the display can be performed in an usual manner. This can be done by a device for measuring the radiation dose of both natural and artificial UV radiation in the erythem-effective range of 280–315 nm according to the U.S. patent application Ser. No. 440,579 which device comprises an optical filter for passing radiation in said range, oscillator means directly responsive to radiation passed by said filter for generating a pulse train having a pulse repetition frequency proportional to the instantaneous intensity of said filtered radiation, a pulse counter counting the number of pulses corresponding to the product of radiation intensity with the irradiation time, and means coupled to said pulse counter for evaluating the sum of the accumulated pulses. This can also be done by an instrument for the measure of the intensity of UV radiation as described in the U.S. Pat. No. 3,851,970 which instrument comprises an optical converter for converting UV radiation into visible radiation, a photoelectric converter disposed adjacent said optical converter for transforming said visible radiation into an electric signal, at least one infrared (hereinafter called IR) filter and at least one UV filter disposed behind the other and having surfaces with dimensions such that the measuring cell has an aperture angle of at least 30°, said filters mounted in front of said optical converter and characterized in that said IR filter has a thickness of at least 6 mm and said UV filter a thickness of at least 2 mm, said filters and said converters cooperatively exhibiting a spectral sensitivity only in the effective wavelength domain between 300 and 315 nm, and an amplifier, connecting the measuring cell with an indicator instrument, said amplifier having a transfer function coacting with the non-linear electrical signal from said photoelectric converter such that the reading from said indicator instrument is given in $\mu\omega/cm^2$ linearly in the range of at least 100 $n\omega/cm^2$ to 1 $m\omega/cm^2$. The method according to the invention can further be used in an instrument for measuring a therapeutic UV-A dose. It is general to subdivide the UV radiation originating from the sun into three ranges:

UV-C range 200 – 280 nm
UV-B range 280 – 315 nm
UV-A range 315 – 380 nm

As generally known the UV-C radiation is completely absorbed by the atmospheric ozon, see FIG. 1. In the wavelength ranges from 295 to 315 nm and 315 to 335 nm, i.e., within a portion of the UV-B and UV-A ranges there exists a partial ozon absorption. Said absorption is stronger towards shorter wavelengths. With respect to the evaluation of the relative intensities it can be said that the erythem-effective UV range lies between 300 and 313 nm and the ozon dependent UV range between 300 and 335 nm.

Figure 2:
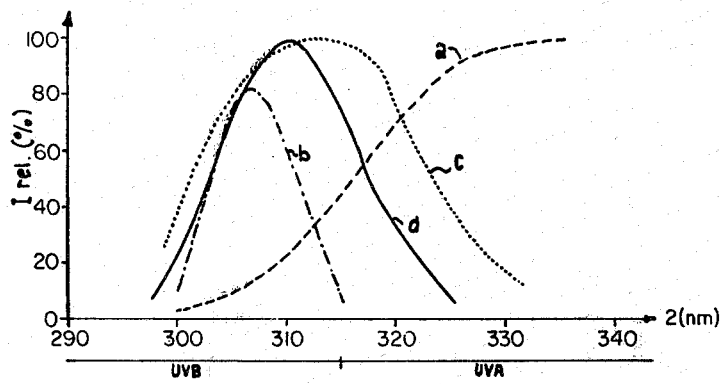
FIG. 2 shows the distribution of the natural UV-A and UV-B radiations with their relative intensity (by Bener) graph $a$; the relative erythem effectiveness (EW), (by Hausser and Vahle) $x$ UV intensity (by Bener) graph $b$; further the relative spectral sensitivity of a measuring cell without filters graph $c$; and the relative spectral sensitivity with a filter combination graph $d$.

Beyond the measuring cells exhibiting a spectral sensitivity within the ozon dependent range there was chosen a cell which in combination with an appropriate filter having the strongest spectral sensitivity within the erythem-effective UV range from 297 to 315 nm and exhibiting a quick decrease of the sensitivity up to 335 nm thus up to the UV-A range which is also ozon dependent, see FIG. 2 graph c. In the upper range of the UV-A between 325 and 335 nm an intensity of 5 to 10% is registered so that some shifts between the ozon dependent UV-B and UV-A have no influence in the praxis. By a corresponding filter combination in cooperation with a semiconductor it can be achieved that the effective spectral sensitivity is limited to the range from 300 to 325 nm, see FIG. 2 graph d. The critical erythem-effective line at 297 nm having an erythem effectiveness of unity cannot be covered thereby, but said not-covered line has a constant ratio with the erythem-effective UV-B between 300 and 315 nm, whereas by using an UV-A filter, in combination with an appropriate cell, an effective spectral sensitivity within the range from 315 to 380 nm can be achieved.

In order to evaluate and display the constant and variable values as a value of time or intensity and to obtain the coefficients needed thereto there are needed a calibration method in connection with a specially suited detector and a special arrangement of the corresponding electronic circuitry. As the starting point a basic calibration value for the UV-A or UV-B is used which can be compared with all the different UV radiating sources. This can be achieved by evaluating the basic calibration value with the aid of any UV source having known lines, practically a qualified calibration source being used, e.g., Philips UV standard 250 W. The basic calibration value refers to the spectral sensitivity of the measuring cell and does not refer to the present intensity of the UV source.

This can be understood by considering that each detector generates a determined current in response to the respective spectral sensitivity and the respective line intensity which can be covered, where it makes no difference how said current is generated whether by a photon current or change of resistance or change capacity.

Said detector current is proportional to the distribution of the measurable lines, practically said values being indicated in percents.

The basic calibration with respect to the relative sensitivity of the detector to the present measurable lines of a calibration source is performed after the measurable lines have been brought to a percentage distribution, whereby the following examples refer to the UV-B-range.

Figure 3:
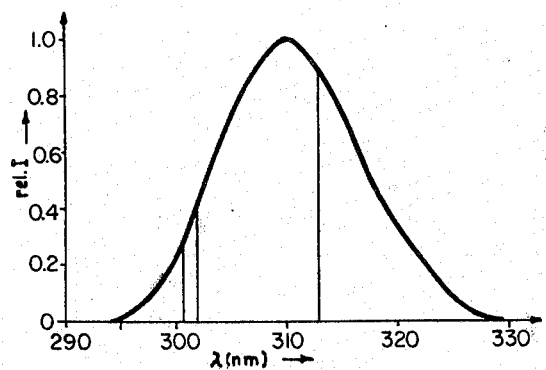
FIG. 3 shows a graph of the relative spectral sensitivity.

In the present case with a "Philips Standard 250 W" quartz lamp and a detector having a measuring range according to graph $d$, FIG. 2 the lines of 302 and 313 nm can be evaluated, see FIG. 3.

The line intensities can be taken from a table of Philips, refer to a distance of 1 meter between the source and the detector and are indicated in $\mu W/cm^2$.

| line 302 | 19.9 $\mu W/cm^2$ |
| line 313 | 46.7 $\mu W/cm^2$ |
| sum of the lines | 66.6 $\mu W/cm^2$ |

Therefrom results a percental line distribution

| line 302 | 19.9 : 0.666 | = 29.8 % |
| line 313 | 46.7 : 0.666 | = 70.2 % |
| | 66.6 $\mu W/cm^2$ | =100 % |

The efficiency of the measuring cell per line in percents is equal to distribution of the line multiplied by the relative intensity of the line according to the spectral sensitivity (FIG. 3)

(2)

Example:
line 302 29.8% × 0.42 = 12.5% efficiency
line 313 70.2% × 0.90 = 63.2% efficiency The efficiency of the measuring cell for all measurable lines is equal to the sum of the individual line efficiencies (3)

The total efficiency of the above source and its measurable lines is therefore equal to 75.7%.

The factor $K_1$ is the ratio of the sum of the distribution (100%) to the total efficiency of the measuring cell, i.e., the reciprocal value of the efficiency.

$$K_1 = \frac{100\%}{\text{total efficiency \%}} \quad (4)$$

Basic calibration value =

$$\frac{\text{present effective intensity of the measurable lines at 1 meter}}{K_1} \quad (5)$$

Example:
$$\frac{66.6\ \mu W/cm^2}{1.32} = 50.5\ \mu W/cm^2$$

It would also be possible to obtain this value by multiplying the line intensities with the efficiency of the cell in accordance with the graph. But this is of no use if the non-measurable lines which are important for the erythem time should be computed. For this purpose the distribution to 100% is needed. This fact was not taken into consideration with the measuring devices used hitherto and therefore it was not possible to use one single device for measuring all the respective sources without the use of conversion factors.

Factor $K_2$
$$K_2 = \frac{\text{relative total intensity of the lines of interest}}{\text{relative intensity of the measurable lines}} \quad (6)$$

Example:
$$K_2 = \frac{\text{lines 302-313 (66.6 }\mu W/cm^2\text{) + lines 230-296 (67.5 }\mu W/cm^2\text{)}}{66.6\ \mu W/cm^2}$$

$$= \frac{134.1\ \mu W/cm^2}{66.6\ \mu W/cm^2} = 2.01$$

Factor $K_3$ is the ratio factor for all basic calibration values to obtain the effective intensity of the source.

$$K_3 = K_1 \times K_2 \quad (7)$$

Example:
$K_3 = K_1 (1.32) \times K_2 (2.01) = 2.65$

Example for the basic calibration value of the source "Philips Stand. 250 W" total intensity for 230–313 nm = 50.5 $\mu W/cm^2$ × 2.65 = 134 $\mu W/cm^2$ On the basis of the preceding computations the intensities of the measurable lines can be obtained by multiplying the distribution of the respective line with a factor $K_4$, where $$K_4 = \frac{\text{basic calibration value}}{\text{total efficiency of the measuring cell in \%}} \quad (8)$$

i.e., we have the same distribution factor as under (1).

Example:
$$K_4 = \frac{50.5 \, \mu W/cm^2}{75.7} = 0.666 \, \mu W/cm^2$$

The intensity of a line is equal to $$\text{distribution of the line} \times K_4 \quad (9)$$

Example:
| | | |
|---|---|---|
| line 302 | 29.8 × 0.666 | = 19.9 μW/cm² |
| line 313 | 70.2 × 0.666 | = 46.7 μW/cm² |
| | | 66.6 μW/cm² |

The intensities of the non-measurable lines can be obtained by multipying the distributions of these lines with the factor $K_4$ if the distributions are known. The distribution of the non-measurable line can be obtained with equation (1) or (9).

For the example with the line 265 nm of the source "Philips Standard 250 W" with 16.2 μW/cm² and a basic calibration value of 50.5 μW/cm² a value of 24.3 is obtained.

For the determination of the erythem threshold times (EZ) there is firstly needed the erythem-effective (EW) intensity line
= intensity line × relative EW of the line The values of the relative EW can be taken from the following table:

Erythem effectiveness $\eta$ for different wavelengths $\lambda$, especially for the Hg lines, by Coblentz (451)

| λ in nm | η | λ in nm | η |
|---|---|---|---|
| 240 | 0.56 | 285.7 | 0.10 |
| 245 | 0.57 | 289.4 | 0.25 |
| 248.2 | 0.57 | 290 | 0.31 |
| 250 | 0.57 | 292.5 | 0.70 |
| 253.7 | 0.55 | 295 | 0.98 |
| 255 | 0.54 | 296.7 | 1.00 |
| 257.6 | 0.49 | 300 | 0.83 |
| 260 | 0.42 | 302.2 | 0.55 |
| 265 | 0.25 | 305 | 0.33 |
| 265.4 | 0.25 | 310 | 0.11 |
| 267.5 | 0.20 | 313 | 0.03 |
| 270 | 0.14 | 315 | 0.01 |
| 275 | 0.07 | 320 | 0.005 |
| 280 | 0.06 | 325 | 0.003 |
| 280.4 | 0.06 | 330 | 0.000 |
| 285 | 0.09 | | |

The factor $K_5$ is used for determining the effective erythem-effective intensity and is equal to $$K_5 = \frac{\text{sum of all relative erythem-effective intensities}}{\text{sum of all relative intensities}} \quad (10)$$

Example:
$$K_5 = \frac{40 \, \mu W/cm^2}{134 \, \mu W/cm^2} = 0.3$$

Thus it is possible to determine the total erythem-effective intensity from the basic calibration value.

total erythem-effective intensity = basic cal. value × $K_3$ × $K_5$ or if $K_3 \times K_5 = K_6$ total erythem-effective intensity = basic cal. value × $K_6$ \quad (11)

Example for a basic calibration value of 50.5 μW/cm²

$$EW_{\text{total intensity}} = 50.5 \, \mu W/cm^2 \times (2.65 \times 0.3) = 50.5 \times 0.795 = 40 \, \mu W/cm^2$$

The erythem threshold time EZ is equal to $$EZ = \frac{\text{erythem dose}}{EW \text{ intensity}} = \frac{\text{erythem dose}}{\text{basic cal. value} \times K_6} \quad (12)$$

For artificial UV the erythem dose is indicated by R. Lotmar, Pfleiderar with 20 mWsec/cm² or $3.33 \cdot 10^2$ μWmin/cm².

The time values are indicated on a rotatable scale or in a table. For the example with a meter reading of 50.5 μW/cm² (with a distance of 1 meter) the following time EZ results:

$$EZ = \frac{3.33 \cdot 10^2 \, \mu W\text{min}/cm^2}{40 \, \mu W/cm^2} = 8.32 \, \text{min}.$$

For sensitive persons to the above time EZ has to be divided by 2 = 4 min.

For unsensitive persons the above EZ has to be multiplied by 2 = 16 min.

When the basic calibration is performed with the aid of a calibration source and the different factors are determined in accordance with the above described method there results to each basic calibration value an electrical value which can control an integrating time counter unit in a conventional manner and which may be used for determining EZ for different doses. If the basic calibration is performed with a time counting unit, e.g., with a member delivering a frequency, there is only needed a multiplication factor in order to allocate a corresponding shunt to the mostly used radiation sources with the aid of a commutator which shunt corresponds to the multiplication factor.

EXAMPLE:

A basic calibration value of 50.5 μW/cm² results in a basic time for the calibration value of $$\frac{3.33 \cdot 10^2 \, \mu W\text{min}/cm^2}{50.5 \, \mu W/cm^2} = 6.6 \, \text{min}.$$

The counter will be set to this time value.
From (12) there results for the source:

$$EZ_{\text{source}} = \frac{3.33 \cdot 10^2 \, \mu W\text{min}/cm^2}{40 \, \mu W/cm^2} = 8.32 \, \text{min}.$$

For the factor $K_7$ the EZ source value must be referred to the basic calibration time, i.e., $$K_7 = \frac{EZ_{source}}{EZ_{basic\ cal.\ time}} = \frac{8.32\ min}{6.6\ min} = 1.26$$

For $EZ_{source}$ the shunt must be larger by the factor $K_7 = 1.26$ or the time must be multiplied by 1.26. E.g., instead of a setting 1000 Hz the new setting is 1000 : 1.26 = 795 Hz.

With respect to a frequency determining the $EZ$ value the following is true for the ratio of the basic time frequency to a respective radiation source for all calibration values:

$$\text{Frequency for a new source} = \frac{\text{basic calibration frequency}}{K_7}$$

or

Multiply the basic calibration time by the factor $K_7$

Shunt variations for different sensitivities and for the adaptation days:
  For sensitive persons the shunts must be decreased by the factor 2 or the frequency must be doubled.
  For unsensitive persons the frequency must be divided by two.
  For up to five adaptation days there is to assume an $EZ$ extension of 0.33 for each day, i.e., a decrease of the frequency.
  Preferably these constant shunts are allocated to the basic frequency which is brought to the $EZ$ value of the respective radiator with the aid of the factor $K_7$.
  Example with the data of the lamp Hanau Q 81.

In accordance with FIG. 3 the lines 302 and 313 nm are evaluated. With the date of the above lamp Q 81 there result:

$$K_3 = 3.15 \times K_5 = 3.72$$
$$K_6 = K_3 \times K_5 = 1.17$$
$$K_7 = 0.855$$

With a basic calibration value of 50.5 $\mu W/cm^2$ there will be obtained a total intensity of:

$$50.5\ \mu W/cm^2 \times 3.15 = 159.1\ \mu W/cm^2$$

According to equation (12) the erythem threshold time $EZ$ is equal to $$\frac{3.33 \cdot 10^2\ \mu Wmin/cm^2}{50.5\ \mu W/cm^2 \cdot 1.17} = 5.65\ min$$

or by starting from the basic calibration time:

$$6.6\ min \times 0.855 = 5.65\ min$$

All readings basing on the basic calibration time have to be multiplied by the factor $K_7$, e.g., a reading of 10 min for the lamp Q 81 means that instead of this value the counter has to be set to $$10 \times 0.855 = 8.55\ min$$

for changing the shunt, e.g., $$\text{basic shunt } 10\ \mu F \times 0.855 = 8.55\ \mu F$$

for changing the basic calibration frequency, e.g., 1000 Hz $$\frac{1000\ Hz}{0.855} = 1170\ Hz$$

The following table shows the distribution of the global natural UV radiation from 300 to 335 nm according to Bener (relative in %)

| | |
|---|---|
| 300 – 315 nm | 12 % |
| 315 – 320 nm | 13 % |
| 320 – 325 nm | 22 % |
| 325 – 330 nm | 26 % |
| 330 – 335 nm | 27 % |

Therefrom the following values are measurable in accordance with FIG. 3

| | |
|---|---|
| 300 – 315 nm | 12 % |
| 315 – 320 nm | 13 % |
| 320 – 325 nm | 22 % |
| | 47 % | and give the following line distribution:

| | | | |
|---|---|---|---|
| 300 – 315 nm | 12 % : 0.47 | = | 25.5 % |
| 315 – 320 nm | 13 % : 0.47 | = | 27.7 % |
| 320 – 325 nm | 22 % : 0.47 | = | 46.8 % |
| | 47 % | | 100 % | and the efficiency of the lines:

| | | | |
|---|---|---|---|
| 300 – 315 nm | 25.5 % · 1.0 | = | 25.5 % efficiency |
| 315 – 320 nm | 27.7 % · 0.5 | = | 13.8 % efficiency |
| 320 – 325 nm | 46.8 % · 0.2 | = | 9.36 % efficiency |
| | 100 % | | 48.66 % |

That results in:

$$K_1 = \frac{100\ \%}{48.66\ \%} = 2.06$$

$K_3$ is equal to $K_1$ in this case since no factor $K_2$ (non-measurable lines) is existing.

$$K_3 = 2.06$$

Total intensity with respect to the basic calibration value of 50.5 $\mu W/cm^2$ $$50.5\ \mu W/cm^2 \cdot 2.06 = 104\ \mu W/cm^2$$

The erythem dose of natural UV is given by R. Lotmar, Pfleiderer and Büttner with 80 mWsec/$cm^2$ or $1.33 \cdot 10^3\ \mu Wmin/cm^2$ with respect to 300 – 313 nm. Thus there is no need to determine the line intensities. Therefore the factor $K_5$ can be determined directly from the ratio of the sum of all relative intensities from 300 – 315 nm to the relative total intensities.

$$K_5 = \frac{12}{47} = 0.255$$

$$EZ_{nat.\ UV} = \frac{1.33 \cdot 10^3\ \mu W min/cm^2}{50.5\ \mu W/cm^2 \cdot 0.53} = 49.5\ min$$

$$K_7 = \frac{49.5\ min\ with\ a\ basic\ cal.\ value\ of\ 50.5}{6.6\ min} = 7.5$$

Therefrom it follows for the shunt variation that the basic calibration time value of the timer must be increased by the factor 7.5, e.g., $$10\ \mu F \cdot 7.5 = 75\ \mu F$$

The basic frequency of, e.g., 1000 Hz will now be $$\frac{1000\ Hz}{7.5} = 133.3\ Hz$$

From the above computations it can be seen that with a chosen basic calibration value or basic calibration $EZ$ any frequency can be chosen as the basic calibration frequency. It is of importance only that the $EZ$'s, shunts, frequencies or other time units have the same ratio to the basic time unit as the factors $K_7$ of the radiation sources.

If the factors $K_7$ of the different radiation sources are known the different corresponding time units can be found easily without the computation of all the different erythem-effective intensities.

According to the above description it is possible to manufacture and calibrate a device having any suited measuring cell and filter arrangement with the aid of any suited radiation source in such a manner that the erythem-effective data of a number of different radiation sources and of the natural light can be measured therewith whereby the elements needed for the commutation consist besides the switches of simple shunts.

It is obvious that the above considerations can easily be transferred to the UV-A range, the calibration method remaining unchanged.

It is possible both to manufacture simple measuring devices having a basic scale and to use the basic values (electrical values) for other display devices allowing to have all displays such as intensity or erythem threshold time in accordance with the radiation source. The total dose can be used for a switch-off function, it is possible to deliver optical or acoustical signals, rotary scales for the different radiation sources coupled with shunts for automatically switch-off can be admitted. These simple devices can also be used for test measurings of intensities since there results automatically an intensity for each $EZ$ and vice versa.

It is evident to one skilled in the art that in the UV-A range there is no question of erythem effectiveness but of the therapeutic effectiveness of said radiation range and that instead of speaking of an erythem threshold one rather speaks of mean clinical values which have to be applied to the patient, of course after having determined his sensitivity to UV-A radiation. The calibration must be done with the UV-A lines of the radiation sources, chosing appropriate lamps, for example with the 334,1 and 365,0 nm lines of the mentioned Philips UV-standard 250 W.

DESCRIPTION OF THE PREFERRED EMBODIMENTS

Figure 4:
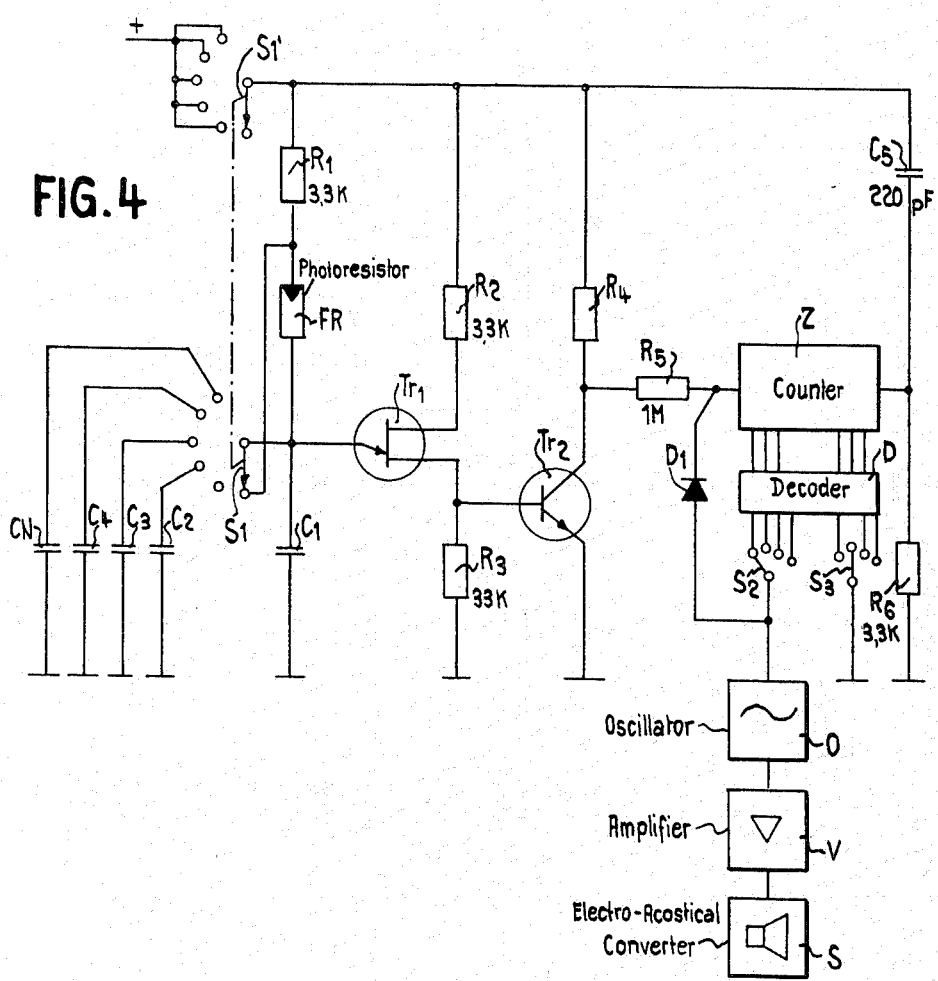
FIG. 4 shows an electrical circuit diagram of a measuring device for measuring the absorbed dose of erythem-effective UV-B radiation.

FIG. 4 shows one embodiment of a device for measuring the erythem effective UV-B radiation with an analog-to-digital converter containing a photoresistor, a counter, a decoder and switching means S2 and S3 considering the sensitivity and the natural or artifical radiation respectively, and as the most interesting elements in this context, the switch S1 and S1'. The whole diagram is explained in detail within the U.S. application Ser. No. 440,579. Although the switcing means taking in account the different quartz lamps could be placed more or less everywhere, for example as additional positions in switches S2 and S3, the best suited place in this case seems to be as additional capacitors $C_n$ connected to the switch S1, adding as much capacitors $C_n$ as lamps are foreseen, whereby the values of the capacitors are chosen according to the method laid forth above. Another possibility is to manufacture for each lamp to be considered a shunt which can be adapted at the outside of the housing of the device at a determined place.

It is obvious to one skilled in the art to adapt the switches for the sensitivity, the days of adaptation and for the different lamps for an analog measuring device like for example one according to the U.S. Pat. No. 3,851,970.

Figure 5:
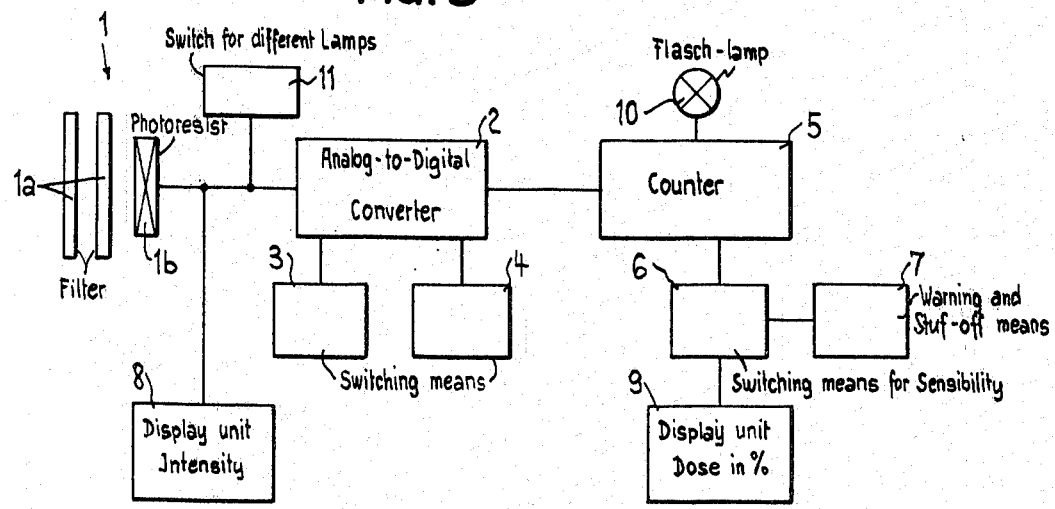
FIG. 5 shows schematically an embodiment of a device for determining the dose of therapeutic UV-A radiation.

FIG. 5 shows schematically one preferred embodiment for therapeutic use in the UV-A range. One remarks the sensing element 1 comprising a filter set 1$a$ composed preferentially of two edge-filters and adapted to the wavelength range of 315 – 380 nm with a peak of transparency at about 340 nm, and a photoresistor 1$b$, an analog-to-digital converter 2 on which act switching means 3 and 4, either for considering therapeutic variations of the dose 3, or for switching on clinical mean values 4, which are known to specialized physicists; a digital counter 5, switching means 6 for considering the sensitivity of the skin of the patient, means 7 for either warning if a preset dose has been reached or for switching-off the lamp or for other known similar functions, displaying means 8 of the intensity of the radiation, displaying means 9 of the already administered dose in percent of the whole dose, a survey lamp 10 working as flashlight which indicates if and how the device works, and a switch 11 for selecting different lamps. The photoresistor 1$b$, the converter 2, the counter 5, the switching means 6 and 7 are the same as those according to FIG. 4.

For the use in hospitals, therapeutical centers or the like the devices according to the FIGS. 4 and 5 can be united in one housing, sharing the above mentioned items like the photoresistor, the converter, the counter and several switching means. In this cases the two filter sets can be rotatably mounted and switch S3 or S2 of FIG. 5 could comprise a position for the UV-A range, or its no longer needed position for natural light could be adapted for the UV-A range.

What is claimed is:

1. A device for measuring the ultra-violet radiation in the UV-A and UV-B ranges, comprising at least one optical filter for passing radiation in one of the ranges of 280–315 nm and 315–380 nm, a radiation detector receiving radiation from said filter and responsive to at least said one of said ranges, electronic means for receiving the signals from the detector and providing an output representative of radiation received from said filter, first switching means connected to said electronic means for programming the same to the skin sensitivity of the user, means coupled to said electronic means for displaying the dose of said radiation and second switching means connected to said electronic means for calibrating the same to the characteristics of different line intensities of at least two different radiation sources in the UV-A and UV-B ranges.

2. A device according to claim 1, wherein said filter is adapted to the UV-B range of 280–315 nm, said detector is a photoresistor, said electronic means comprise an analog-to-digital converter and a counter; the device comprises further a switch for selecting one of natural and artificial radiation sources, and a switch for considering the days of adaption; and wherein said second switching means are calibrated on the base of spectral sensibility of the photoresistor in the UV-B range and of erythem threshold time.

3. A device according to claim 1, wherein said filter is adapted to the UV-range of 315–380 nm, said detector is a photoresistor, said electronic means comprise an analog-to-digital converter and a counter;. further comprising third switching means for selecting therapeutic values of the dose, means for displaying the already administered dose of UV-A radiation and a survey flash lamp; and wherein said second switching means are calibrated on the base of the spectral sensibility of the photoresistor in the UV-A range.

4. A device according to claim 1, for measuring in the UV-A and UV-B range, comprising optical filters for both ranges mounted to be put in place separately, wherein said detector is a photoresistor, said electronic means comprise an analog-to-digital converter and a counter; the device further comprising a switch for selecting a wavelength range, a flashlamp for the survey of the working of the device and means for considering, according to the chosen wavelength range, therapeutic mean values and one of different quartz lamps, and means for displaying the intensity and the dose of the selected radiation.

* * * * *